United States Patent [19]
Usuta et al.

[11] Patent Number: 5,307,591
[45] Date of Patent: May 3, 1994

[54] WEATHER STRIP

[75] Inventors: Takahiro Usuta; Hiroshi Urume, both of Chiba, Japan

[73] Assignee: Kinugawa Rubber Industrial Co., Ltd., Chiba, Japan

[21] Appl. No.: 783,568

[22] Filed: Oct. 25, 1991

[30] Foreign Application Priority Data

Oct. 29, 1990 [JP] Japan .................. 2-291386

[51] Int. Cl.$^5$ .............................. E06B 7/16
[52] U.S. Cl. ................... 49/476.1; 49/475.1
[58] Field of Search ............. 49/476, 485, 488, 493, 49/498, 497; 47/475.1

[56] References Cited

U.S. PATENT DOCUMENTS

| | | | |
|---|---|---|---|
| 2,093,727 | 9/1937 | Julien | 49/67 X |
| 2,622,286 | 12/1952 | Beck | 49/498 X |
| 2,647,792 | 8/1953 | Flemming | 49/485 X |
| 2,737,412 | 3/1956 | Smith et al. | 49/476 X |
| 3,927,493 | 12/1975 | Tsuneishi et al. | 49/485 X |
| 4,232,081 | 11/1980 | Pullan | 49/498 X |
| 4,488,753 | 12/1984 | Kodke | 49/485 |
| 4,513,044 | 4/1985 | Shigeri et al. | 49/498 X |
| 4,617,220 | 10/1986 | Ginster | 49/498 X |
| 4,858,385 | 8/1989 | Bright | 49/488 |
| 4,875,307 | 10/1989 | Barbero | 49/440 X |
| 4,934,101 | 6/1990 | Hannya et al. | 49/488 X |
| 5,016,394 | 5/1991 | Iida et al. | 49/441 |

FOREIGN PATENT DOCUMENTS

| | | |
|---|---|---|
| 2209190 | 8/1973 | Fed. Rep. of Germany . |
| 61-64555 | 4/1986 | Japan . |
| 61-163017 | 7/1986 | Japan . |
| 63-91958 | 6/1988 | Japan . |
| 2-81745 | 2/1990 | Japan . |
| 227322 | 9/1990 | Japan .................. 49/485 |

*Primary Examiner*—Peter M. Cuomo
*Assistant Examiner*—Jerry Redman
*Attorney, Agent, or Firm*—Bachman & LaPointe

[57] ABSTRACT

A weather strip for an automotive back door includes a seal lip having a hollow therein. An appropriate portion of the outer side of the seal lip is projected toward a direction outward from a vertical direction relative to a seal plane of a vehicle body where the seal lip elastically contacts thereto. The projected portion is wedge-shaped to function as a drain lip.

16 Claims, 3 Drawing Sheets

WEATHER STRIP

BACKGROUND OF THE INVENTION

1. Field of the Invention

The present invention relates generally to a weather strip for an automotive vehicle. Specifically, the present invention relates to a weather strip attached to a back door of an automotive vehicle of the hatch back type.

2. Description of The Background Art

Generally, an automotive vehicle of the hatch back type includes a back door weather strip attached to a back portion of the body along a circumference of an opening therethrough corresponding to the circumference of a back door contacted thereto for providing a seal between the back door and the body when the door is closed.

A side weather strip can be additionally attached to appropriate portions of both sides of the back door for reducing wind noise when the vehicle is moving. The side weather strip is generally attached along an edge portion of the back door side to an inner panel of the back door via securing means, such as a clip. Such a weather strip includes a seal lip having a hollow therein to seal a gap remaining between the back door and the body of the vehicle for establishing an elastic contact with the body when the door is closed. The seal lip is positioned so as to have coplanarity with the outer surface of the back door.

Another weather strip can also be attached to a top portion of the back door.

Weather strips attached to the circumference of the back door prevent dropping of water droplets into a vehicle interior if the door is opened in rainy conditions or after washing. When the back door is opened, water droplets adhered to the back door tumble down from the door edge into or outside of a drip channel, which is formed in a floor portion of the vehicle body to receive water droplets, via the seal lip of the weather strip. Thus, the weather strip keeps the vehicle interior from getting wet by leading water droplets to the drip channel or outside thereof.

However, if the back door is opened quickly and/or roughly, water droplets adhered to the back door tend to flow along curvature of the weather strip surface toward the inside portion of the door edge and splash therefrom into the vehicle interior.

Japanese Patent First Publication (unexamined) No. 2-81745 discloses a seal strip for sealing a space between two parts including a base member having an end intermediate both parts and a seal lip formed integrally with the end of the base member. The seal lip is extended to surround the end for providing a seal by establishing elastic contact with both parts. The base member is made of hard material and the seal lip is made of soft material.

However, if water droplets are adhered on the upper part, they tend to flow around into an interior of the seal strip when the door is opened, wetting the interior of the vehicle.

SUMMARY OF THE INVENTION

It is therefore a principal object of the present invention to provide a weather strip attached to side edges of an automotive back door which keeps a vehicle interior from getting wet.

It is another object of the present invention to provide a weather strip having characteristics of draining water therefrom.

It is a further object of the present invention to provide a weather strip which can prevent water from rounding a surface thereof toward an interior.

In order to accomplish the aforementioned and other objects, a weather strip for an automotive back door is composed of a hollow seal lip to seal a gap remaining between the back door and a vehicle body when the back door is closed for establishing elastic contact with both sides of a body opening corresponding to the circumference of the back door, and a drain lip having a wedge shape projected from the seal lip toward a direction outward from a vertical direction relative to a seal surface of the body, to be elastically sealed to prevent water droplets from entering into the inside of the drain lip for keeping a vehicle interior from getting wet.

The seal lip and the drain lip may be made of sponge rubber. The drain lip may be formed integrally with the seal lip by extrusion molding.

An edge portion of the weather strip including the seal lip and the drain lip may be coated with a desired material, such as silicon.

The drain lip may be shaped so as to form a traingle with the seal lip. The edge of the drain lip corresponding to one of base angles of the triangle can be located higher than the other base angle which is directed toward the vehicle interior at a desired angular difference so as to establish substantial fitting between the triangle and the seal surface. Cutting out of the drain lip at a predetermined portion is preferable for promoting substantial fitting between the triangle and the seal surface.

Alternatively, a weather strip for an automotive back door is composed of a base member attached to the back door, the base member being shaped so as to conform to an edge portion of the back door, a hollow seal lip extended from the base member toward a direction of an vehicle interior, the hollow seal lip seals a gap remaining between the back door and a vehicle body when the back door is closed for establishing elastic contact with both sides of a body opening corresponding to the circumference of the back door, and a drain lip having a wedge shape projected from the base member toward a direction outward from a vertical direction relative to a seal surface of the body to be elastically sealed to prevent water droplets from flowing into the inside of the drain lip for keeping the vehicle interior from getting wet.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
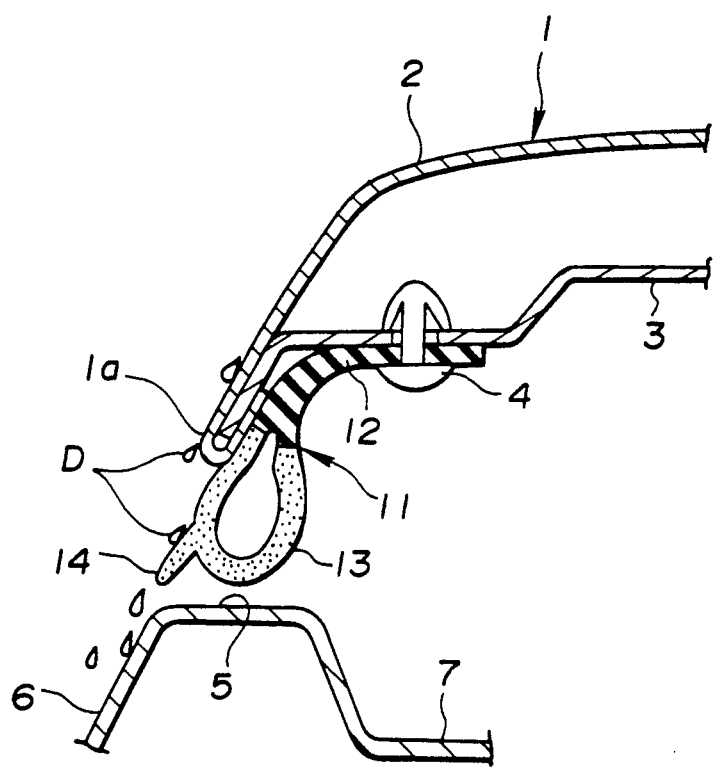
FIG. 1 is a cross sectional view of a weather strip according to the present invention in a door opened condition.

Referring now to the drawings, particularly to FIG. 1, numeral 1 generally designates a back door of an automotive vehicle of the hatch back type in a door opened condition, the door having an outer panel 2 and an inner panel 3. A weather strip 11 including a base member or portion 12 and a seal lip or hollow seal portion 13 is attached to a side edge portion 1a of the back door so as to extend along the inner surface of the edge portion 1a and to project therefrom. The hollow seal portion or seal lip 13 is positioned so as to have coplanarity with an exposed surface of the outer panel 2. The weather strip 11 is secured to an inner surface of the inner panel 3 adjacent the edge portion 1a by securing means 4, such as a clip, via the base member 12. The base member 12 is made of solid rubber and the seal lip 13 is made of sponge rubber, though both may be formed integrally by extrusion molding, for example. A drain lip portion 14 having a wedge shape is formed integrally with the seal lip 13 and extended from the outer surface thereof toward an exterior of the vehicle. The drain lip portion 14 is formed so as to be directed toward a direction outward from a vertical direction relative to a seal plane 5 of a body panel 6. Thus, water droplets D adhered to the drain lip 14 are led toward the vehicle exterior. A drip channel 7 is formed on a floor portion of the vehicle body to receive water droplets D.

When the back door 1 is opened, water droplets D adhered to the outer panel 2 tumble down along the surface thereof and reach the edge of the drain lip 14 through the seal lip 13. Then, water droplets D are substantially drained from the edge of the drain lip 14 toward the outside of the drip channel 7 because of the extended direction of the drain lip 14. Water droplets D cannot cross the drain lip 14 to the interior, therefore, droplets cannot flow over the seal lip 13, and so never drip into the vehicle interior.

The edge portion of the weather strip 11 including the seal lip 13 and the drain lip 14 may be coated with an appropriate material, such as silicon. The coated portion of the seal lip 13 and the drain lip 14 is water repellent, therefore, water droplets D can easily tumble therefrom. Thus, the draining effect of the weather strip 11 can be further enhanced.

Figure 2:
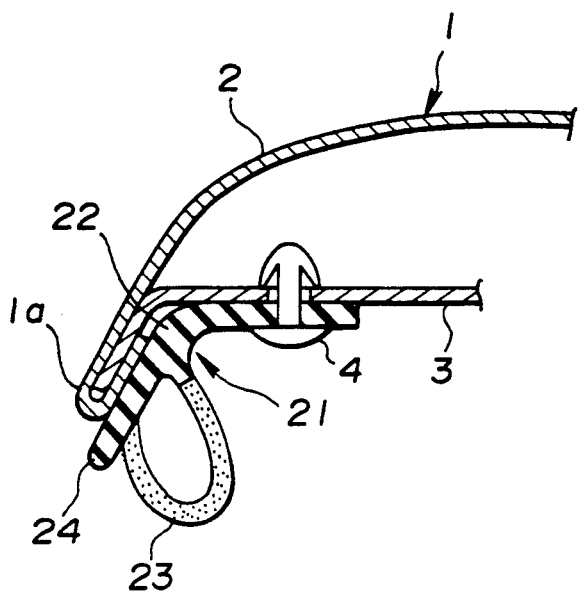
FIG. 2 is a cross sectional view of a weather strip according to the second embodiment of the present invention in a door opened condition.
Figure 2:
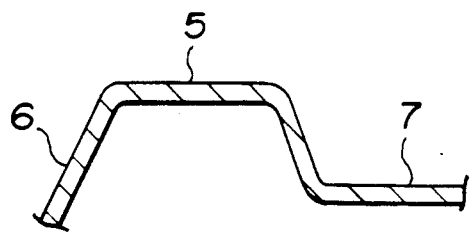
Figure 3:
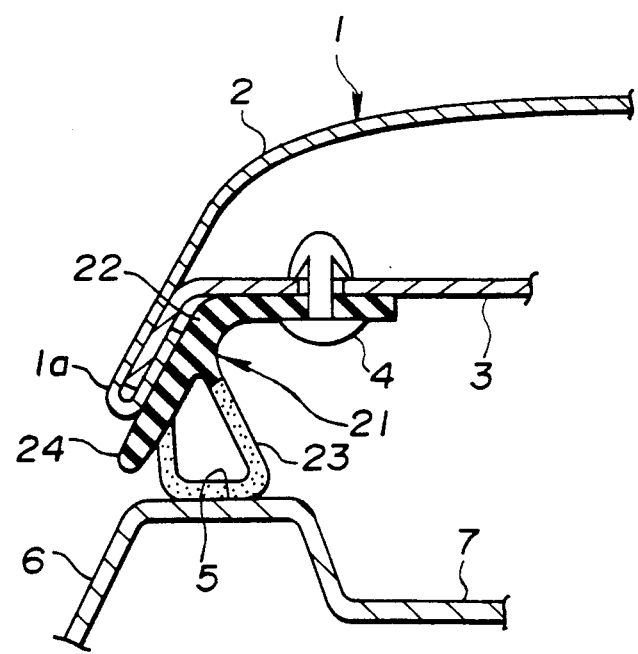
FIG. 3 is a cross sectional view of the weather strip of FIG. 2 in a door closed condition.

Referring now to FIGS. 2 and 3, showing the second embodiment of the present invention, a weather strip 21 includes a base portion or base member 22 which is shaped so as to conform to the edge portion 1a, and a hollow seal portion or seal lip 23 extruded from the base member 22. The base member 22 is made of solid rubber and the seal lip 23 is made of sponge rubber, though both may formed integrally by extrusion molding, for example. An edge portion of the base member 22 is wedge-shaped and is projected to the vehicle exterior. Thus, the edge portion of the base member 22 functions as a drain lip portion 24.

When the back door 1 is opened, water droplets D can be substantially drained therefrom because of the direction and the shape of the drain lip 24.

When the back door 1 is closed, the drain lip 24 is not directly affected by pressure applied to the seal lip 23, because the drain lip 24 is made of solid rubber having different characteristics form the material of the seal lip 23. The drain lip 24, therefore, is not projected excessively toward the exterior. Thus, outer appearance of the weather strip 21 when the back door 1 is closed can be enhanced.

Figure 4:
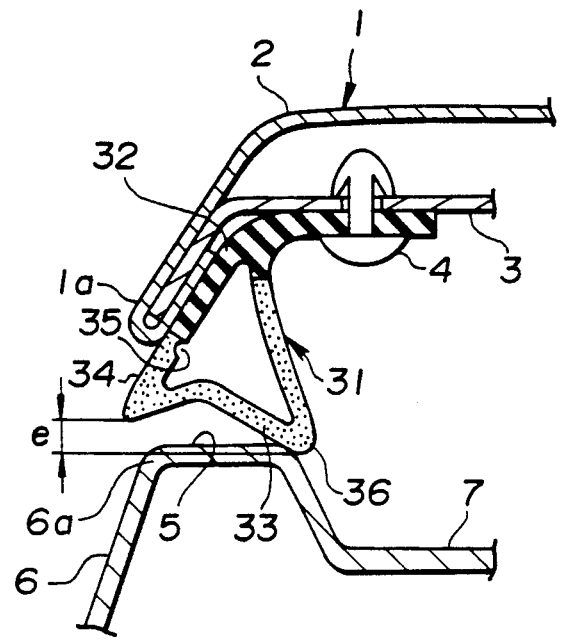
FIG. 4 is a cross sectional view of a weather strip according to the third embodiment of the present invention in a door opened condition.
Figure 5:
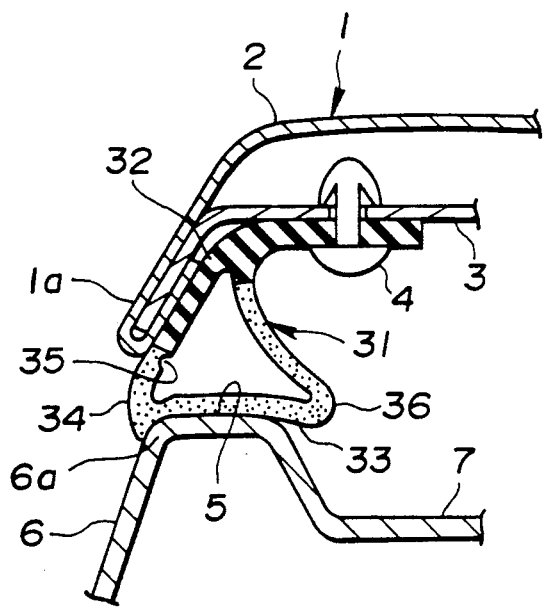
FIG. 5 is a cross sectional view of the weather strip of FIG. 4 in a door closed condition.

FIGS. 4 and 5 show the third embodiment of the present invention. A weather strip 31 is composed of a base member 32 which is shaped so as to conform to the edge portion 1a, and a hollow seal portion or seal lip 33 extruded from the base member 32 so as to form a triangular wedge. Both base angles of the triangular portion belong to the seal lip 33. The base member 32 is made of solid rubber and the seal lip 33 is made of sponge rubber, though both may be formed integrally by extrusion molding, for example. An outer base angle formed by the vertex of two sides of the triangular wedge of the seal hollow portion 33, which is extended from an edge of the base member 32, is and projected toward the vehicle exterior. Thus, the outer base angle of the seal lip 33 functions as a drain lip 34. A notch 35 is cut out from a portion of the seal lip 33 adjacent the end of the edge portion 1a. The outer base angle of the seal lip 33 is located higher than an inner base angle 36 thereof with a difference of e, as shown in FIG. 4.

When the back door 1 is opened, the drain lip 34 is projected from the edge portion 1a toward the exterior, then, water droplets can be substantially drained therefrom.

When the back door 1 is closed, the seal lip 33 is pulled toward the vehicle interior because of the height difference of e. The drain lip 34 is bent from the notch 35, then the seal lip 33 is fitted with the surface of the seal plane 5. The drain lip 34 is bent along the shape of a corner 6a of the body panel 6. Therefore, the outer appearance of the weather strip 33 can be enhanced simultaneously with the draining effect thereof.

According to the present invention, in a weather strip for a hatch type back door, an appropriate portion of the outer side of the seal lip is projected toward a direction outward from a vertical direction, relative to the seal plane where the seal lip elastically contacts the door. The projected portion is formed so as to have a wedge shape to function as a drain lip. Therefore, water droplets tumbling down from the back door cannot flow into the inside of the drain lip. Thus, the drain lip can substantially drain water therefrom even if the back door is opened quickly and/or roughly. Accordingly, splashing of water droplets toward the vehicle interior can be prevented.

While the present invention has been disclosed in terms of the preferred embodiment in order to facilitate better understanding of the invention, it should be appreciated that the invention can be embodied in various ways without depending from the principle of the invention. Therefore, the invention should be understood to include all possible embodiments and modification to the shown embodiments which can be embodied without departing from the principle of the inventions as set forth in the appended claims.

What is claimed is:

1. A weather strip for providing a seal between a movable door and the body of an automotive vehicle, said weather strip comprising:

a hollow seal portion having a coplanar surface with an exposed surface of the door extending downwardly therefrom for sealing a gap formed between the movable door and a seal plane of the automotive vehicle body when said door is in a closed position; and a drain lip portion extending from said hollow seal portion toward said seal plane of the vehicle body, said drain lip portion including guide means for directing water away from the gap and the seal plane extending along the coplanar surface of said hollow portion toward the downward and outward direction relative to the perpendicular direction of the vehicle body thereby preventing water from entering the vehicle when the door is opened and wherein the guide means rests on a surface of the vehicle body adjacent the seal plane when the door is in the closed position.

2. A weather strip according to claim 11, wherein said hollow seal portion and said drain lip portion are formed of a sponge rubber material.

3. A weather strip according to claim 2, wherein said hollow seal portion and said drain lip portion are coated with silicon material.

4. A weather strip according to claim 1, wherein said drain lip portion is formed integrally with said hollow seal portion.

5. A weather strip according to claim 1, wherein said hollow seal portion is in the form of a triangle and said drain lip extends from and is defined in part by the vertex of two sides of the triangle.

6. A weather strip according to claim 5, wherein one side of the triangle of said hollow seal portion which forms the vertex seals on the seal plane of the automotive vehicle body when said door is in a closed position.

7. A weather strip according to claim 6, wherein said one side of said triangle is formed with a notch which assists the guide means to rest on the adjacent surface of the vehicle body.

8. A weather strip for providing a seal between a movable door and the body of an automotive vehicle, said weather strip comprising:
   a base portion having a coplanar surface with an exposed surface of the door and means for securing the base portion to the door;
   a hollow seal portion extending downwardly from said base portion along said coplanar surface for sealing a gap formed between the movable door and a seal plane of the automotive vehicle body when said door is in a closed position; and
   a drain lip portion extending from said hollow seal portion toward said seal plane of the vehicle body, said drain lip portion including guide means for directing water away from the gap and the seal plane extending along the coplanar surface toward the downward and outward direction relative to the perpendicular direction of the vehicle body thereby preventing water from entering the vehicle when the door is opened and wherein the guide means rests on a surface of the vehicle body adjacent the seal plane when the door is in the closed position.

9. A weather strip according to claim 8, wherein said base portion is formed of solid rubber.

10. A weather strip according to claim 8, wherein said hollow seal portion and said drain lip portion are formed of a sponge rubber material.

11. A weather strip according to claim 8, wherein said base portion and said drain lip portion are formed of solid rubber.

12. A weather strip according to claim 8, wherein said base portion and said hollow seal portion and said drain lip portion are formed of an integral extruded molding.

13. A weather strip for providing a seal between a movable door and the body of an automotive vehicle, said weather strip comprising:
   a base portion having a coplanar surface with the door and means for securing the base portion to the door;
   a hollow seal portion extending downwardly from said base portion along said coplanar surface for sealing a gap formed between the movable door and a seal plane of the automotive vehicle body when said door is in a closed position, said hollow seal portion being in the form of a triangle having a first side and a second side intersecting at a vertex wherein the second side of the triangle seals on the seal plane of the automotive vehicle body when said door is in the closed position; and
   a drain lip portion extending from said hollow seal portion toward said seal plane of the vehicle body, said drain lip portion including guide means extending from and defined in part by the vertex of the triangle for directing water away from the gap and the seal plane extending along said coplanar surface toward the downward and outward direction relative to the perpendicular direction of the vehicle body thereby preventing water from entering the vehicle when the door is opened and wherein the guide means rests on a surface of the vehicle body adjacent the seal plane when the door is in the closed position.

14. A weather strip according to claim 13 wherein said second side of the triangle is formed with a notch which assists the guide means to rest on the adjacent surface of the vehicle body while the second side seals on the seal plane.

15. A weather strip according to claim 14, wherein said drain lip portion is formed integrally with said hollow seal portion.

16. A weather strip according to claim 14, wherein said hollow seal portion and said drain lip portion are formed of a sponge rubber material.

* * * * *